United States Patent
Koh et al.

(10) Patent No.: US 10,488,427 B2
(45) Date of Patent: Nov. 26, 2019

(54) WHEEL SPEED SENSOR

(71) Applicant: Robert Bosch GmbH, Stuttgart (DE)

(72) Inventors: Ket Seng Koh, Livonia, MI (US); Walter Heinrich, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/127,703

(22) PCT Filed: Jan. 22, 2015

(86) PCT No.: PCT/US2015/012444
§ 371 (c)(1),
(2) Date: Sep. 20, 2016

(87) PCT Pub. No.: WO2015/156888
PCT Pub. Date: Oct. 15, 2015

(65) Prior Publication Data
US 2017/0176488 A1    Jun. 22, 2017

Related U.S. Application Data

(60) Provisional application No. 61/978,568, filed on Apr. 11, 2014.

(51) Int. Cl.
*G01P 3/488*    (2006.01)
*H02K 29/08*    (2006.01)
(Continued)

(52) U.S. Cl.
CPC .............. *G01P 3/488* (2013.01); *G01D 5/145* (2013.01); *G01P 1/026* (2013.01); *H02K 29/08* (2013.01); *F16C 41/007* (2013.01)

(58) Field of Classification Search
CPC .......... G01P 3/487; G01P 3/488; G01P 3/489; G01P 1/026; F16C 41/007; H02K 29/08;
(Continued)

(56) References Cited

U.S. PATENT DOCUMENTS

| | | | | |
|---|---|---|---|---|
| 3,911,302 A | * | 10/1975 | DeClaire | ................. B60T 8/171 |
| | | | | 310/168 |
| 4,601,448 A | | 7/1986 | Miyazaki et al. | |

(Continued)

FOREIGN PATENT DOCUMENTS

| AU | 8047591 A | 3/1993 |
|---|---|---|
| CN | 1800859 A | 7/2006 |

(Continued)

OTHER PUBLICATIONS

International Search Report and Written Opinion for Application No. PCT/US2015/012444 dated Jul. 13, 2015 (23 pages).

(Continued)

*Primary Examiner* — Huy Q Phan
*Assistant Examiner* — Dustin R Dickinson
(74) *Attorney, Agent, or Firm* — Michael Best & Friedrich LLP

(57) ABSTRACT

A wheel speed sensor includes an electromagnetic sensor having an electromagnetic sensor head disposed at a distal end thereof and a flange acting as a sensor support. The electromagnetic sensor head includes a magnet and an integrated circuit for sensing movement of a tone ring formed of magnetic attractive material. A sensor interface disposed at the distal end of the electromagnetic sensor is mechanically secured to a flange interface of the flange. The sensor interface can include outwardly projecting opposing tabs on opposing sides of the electromagnetic sensor head that are received by opposing apertures in parallel, spaced projecting arms that form the flange interface. In another arrangement, the sensor is inserted into an opening defined in the flange, and a retainer element is inserted into a slot formed on the electromagnetic sensor head such that the sensor cannot be extracted from the opening. The flanges are either annular and have an aperture for receiving a wheel (Continued)

shaft, or they have bushings for receiving a fastener to secure the wheel speed sensor to a vehicle.

20 Claims, 16 Drawing Sheets

(51) Int. Cl.
*G01D 5/14* (2006.01)
*G01P 1/02* (2006.01)
*F16C 41/00* (2006.01)

(58) Field of Classification Search
CPC ........ G01D 5/145; G01D 5/147; G01D 5/142; G01R 33/0047
See application file for complete search history.

(56) References Cited

U.S. PATENT DOCUMENTS

| | | | | |
|---|---|---|---|---|
| 5,166,611 | A * | 11/1992 | Kujawa, Jr. | G01P 1/00 29/520 |
| 5,530,344 | A * | 6/1996 | Caillaut | F16C 19/185 277/317 |
| 5,614,822 | A * | 3/1997 | Sakamoto | G01P 3/443 324/174 |
| 5,920,193 | A | 6/1999 | Tola et al. | |
| 6,267,509 | B1 * | 7/2001 | Morimura | F16C 33/7886 324/174 |
| 6,463,818 | B1 | 10/2002 | Stagg et al. | |
| 8,237,431 | B2 | 8/2012 | Fruehling et al. | |
| 2002/0125881 | A1 | 12/2002 | Stroeters et al. | |
| 2003/0222642 | A1 * | 12/2003 | Butzmann | G01D 5/147 324/207.21 |
| 2004/0119465 | A1 | 6/2004 | Clark | |
| 2005/0140357 | A1 | 6/2005 | Takizawa et al. | |
| 2006/0286864 | A1 * | 12/2006 | Bethurum | H01R 4/4818 439/595 |
| 2007/0031076 | A1 | 8/2007 | Shigeoka et al. | |
| 2009/0096441 | A1 * | 4/2009 | Masuda | G01P 1/026 324/173 |
| 2009/0173155 | A1 * | 7/2009 | Campbell | G01P 1/026 73/494 |
| 2009/0285515 | A1 | 11/2009 | Kawamura et al. | |
| 2010/0072988 | A1 * | 3/2010 | Hammerschmidt | H03M 1/28 324/207.25 |
| 2012/0086440 | A1 | 4/2012 | Shibata et al. | |
| 2012/0112742 | A1 | 10/2012 | Schrader | |
| 2013/0335068 | A1 * | 12/2013 | Dwyer | G01D 5/147 324/207.11 |

FOREIGN PATENT DOCUMENTS

| | | |
|---|---|---|
| CN | 101617232 A | 12/2009 |
| CN | 203011935 U | 6/2013 |
| DE | 20206099 U1 | 7/2002 |
| EP | 1701045 A1 | 9/2006 |
| EP | 1855003 | 11/2007 |
| FR | 2756879 A1 | 12/1998 |
| JP | H02225823 A | 9/1990 |
| JP | 2009144812 A | 7/2009 |
| JP | 5166218 B2 | 3/2013 |
| WO | 2010116206 A1 | 10/2010 |
| WO | 2010133924 A1 | 11/2010 |
| WO | 2013098584 A1 | 7/2013 |

OTHER PUBLICATIONS

Office Action from the State Intellectual Property Office of the People's Republic of China for Application No. 201580019034.8 dated Aug. 20, 2018 (10 pages).

Office Action from the State Intellectual Property Office of the People's Republic of China for Application No. 01580019034.8 dated Mar. 15, 2019 (11 pages).

Third Office Action from the National Intellectual Property Administration, P. R. China for Application No. 201580019034.8 dated Jul. 3, 2019 (15 pages).

* cited by examiner

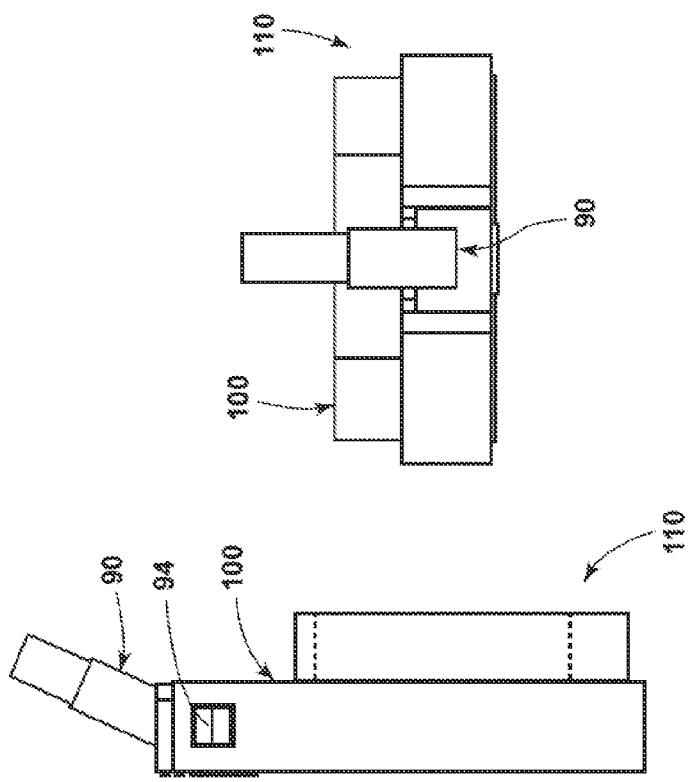
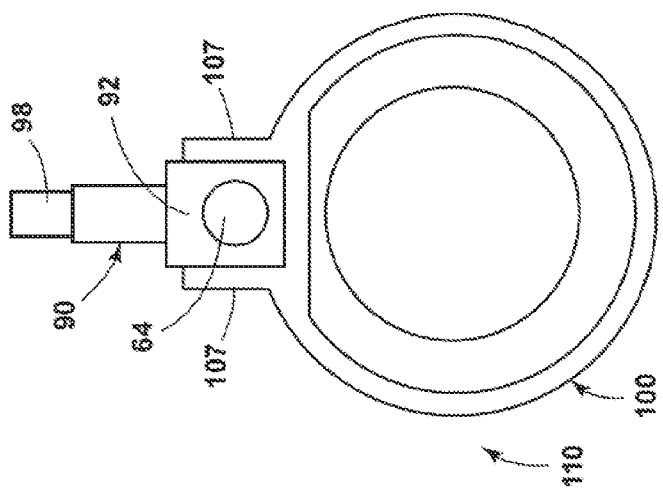
FIG. 7

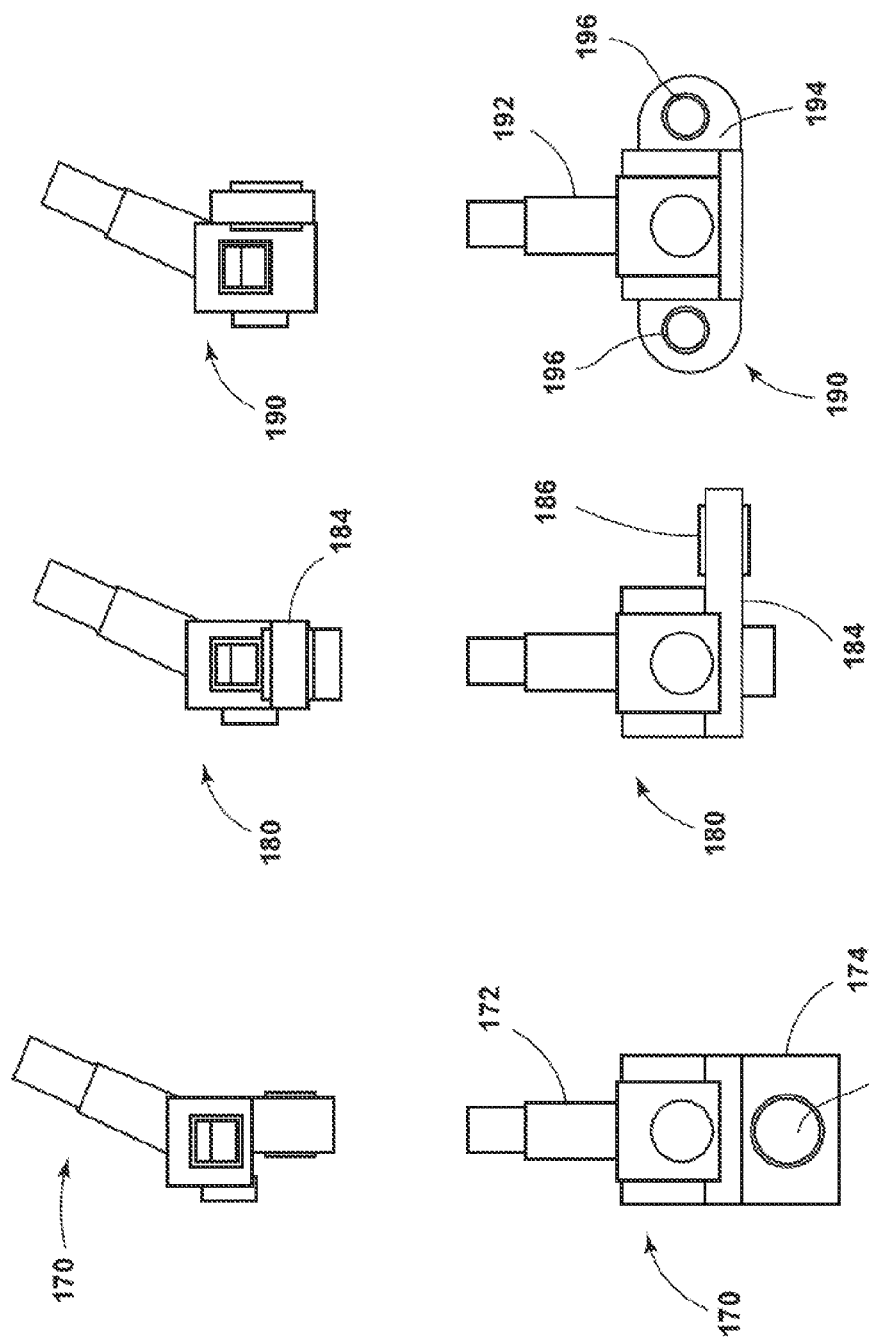

WHEEL SPEED SENSOR

RELATED APPLICATIONS

This application claims priority from provisional application 61/978,568, filed Apr. 11, 2014, the entire content of which is hereby incorporated by reference.

BACKGROUND

The present invention relates to a wheel speed sensor, and preferably a wheel speed sensor and monitoring system for a wheeled vehicle.

SUMMARY

In one embodiment, the invention provides a wheel speed sensor including an electromagnetic sensor comprising: an electromagnetic sensor head disposed at a distal end of the electromagnetic sensor, the electromagnetic sensor head comprising a magnet and an integrated circuit, the electromagnetic sensor head configured to sense movement by a tone ring comprising magnetic attractive material, a communication connector disposed at a proximal end of the electromagnetic sensor and in communication with the electromagnetic sensor head; and a sensor interface disposed at the distal end of the electromagnetic sensor. The wheel speed sensor also includes a flange having a flange interface secured to the sensor interface of the electromagnetic sensor.

In one embodiment, the flange of the wheel speed sensor has an annular shape and includes an open bore aperture, the flange comprising a spacer for receiving a wheel shaft of a vehicle through the open bore aperture.

In another embodiment, the sensor interface and the flange interface are configured to provide a snap fitting connection of the electromagnetic sensor to the flange.

In one embodiment of the wheel speed sensor, the electromagnetic sensor head is a substantially box-shaped electromagnetic sensor head, and the sensor interface is defined by a slot extending about at least three sides of the substantially box-shaped electromagnetic sensor head and a separate retainer element. Further, the flange interface comprises a pair of parallel spaced arms projecting outwardly from the flange, the pair of spaced arms include inwardly facing projections at outward distal ends thereof, wherein the electromagnetic sensor is secured to the flange interface by inserting the substantially box-shaped electromagnetic sensor head between the pair of spaced arms of the flange interface and securement of the retainer element within the slot of the substantially box-shaped electromagnetic sensor head.

In one embodiment of the wheel speed sensor wherein the electromagnetic sensor head comprises a substantially box-shaped electromagnetic sensor head, the sensor interface is flexible tabs projecting outwardly from opposing faces of the substantially box-shaped electromagnetic sensor head and the flange interface comprises a pair of parallel spaced arms projecting outwardly from the flange, said parallel spaced arms having opposing facing apertures, wherein the insertion of the substantially box-shaped electromagnetic sensor head between the parallel spaced arms of the flange interface, with the flexible tabs oriented toward the respective parallel spaced arms, locks the flexible tabs in the apertures to secure the electromagnetic sensor to the flange.

In another embodiment of the wheel speed sensor, the electromagnetic sensor head comprises a substantially box-shaped electromagnetic sensor head, the sensor interface comprises a pair of opposing and outwardly facing projections projecting from opposing sides of the substantially box-shaped electromagnetic sensor head, and the flange interface comprises a pair of semi-rigid, parallel spaced arms projecting outwardly from the flange, the semi-rigid, parallel spaced arms having opposing facing apertures, wherein insertion of the substantially box-shaped electromagnetic sensor head between the semi-rigid, parallel spaced arms, with the projections of the sensor head oriented toward the respective semi-rigid, parallel spaced arms, locks the respective projections into the respective opposing facing apertures to secure the electromagnetic sensor to the semi-rigid, parallel spaced arms.

In another embodiment of the wheel speed sensor, the flange comprises at least one bushing for securing the wheel speed sensor to a fixed part of a vehicle and not with the wheel shaft.

In another embodiment, the tone ring is formed by magnetic attractive material, typically ferrite.

In another embodiment of the wheel speed sensor, the flange comprises one of a plurality of flanges having different shapes for mounting at different mounting locations on a vehicle, each of the plurality of flanges having the same flange interface for securing to the sensor interface of the electromagnetic sensor.

In another embodiment of the invention, a wheel speed monitoring system comprises a wheel speed sensor that includes an electromagnetic sensor with a communication connector disposed at a proximal end and with an electromagnetic sensor head including a magnet and an integrated circuit disposed at a distal end, the communication connector in communication with the electromagnetic sensor head, and a sensor interface disposed at the distal end of the electromagnetic sensor. The wheel speed sensor further includes a flange including a flange interface configured for securement to the sensor interface of the electromagnetic sensor. The wheel speed monitoring system further comprises a tone ring formed of magnetically attractive material for securement to a wheel bearing or wheel, the tone ring including an open bore aperture for receiving a wheel shaft, the tone ring further including one of: a plurality of projecting elements projecting outwardly from one nice of the tone ring and disposed in an alternating pattern at least adjacent an outer edge of the one face of the tone ring, and a plurality of apertures disposed in an aperture pattern at least adjacent an outer edge of the one face of the tone ring, wherein rotation of the tone ring relative to the electromagnetic sensor alters the magnetic field density projected onto an integrated circuit. A magnetic-field sensor, such as Hall sensor or Magneto Resistive sensor in the integrated circuit detects variation of the projected magnetic field density and triggers the integrated circuit to provide an electrical output that is proportional to rotational speed of the tone ring relative to the electromagnetic sensor.

One embodiment also includes a wheel bearing having an aperture for receiving a wheel shaft, and the wheel bearing configured to receive the tone ring.

In another embodiment of a wheel speed monitoring system, the flange comprises a cylindrical shaped ring and an outer element extending outwardly about a portion of the outer circumferential surface of the cylindrical shaped ring, the flange including an open bore aperture for receiving a wheel shaft, wherein the flange acts as a spacer along a wheel shaft.

In one embodiment of a wheel speed monitoring system, the electromagnetic sensor head comprises a substantially box-shaped electromagnetic sensor head, and the sensor interface comprising a slot extending about at least three sides of the substantially box-shaped electromagnetic sensor head and a separate retainer element, wherein the flange interface comprises a pair of parallel spaced arms projecting outwardly from the flange, the pair of parallel spaced arms including facing projections at outward distal ends thereof, and wherein the substantially box-shaped electromagnetic sensor head is secured to the flange interface by insertion of the substantially box-shaped electromagnetic sensor head between the pair of parallel spaced arms of the flange interface and securement of the retainer element within the slot.

In another embodiment of the wheel speed monitoring system, the pair of parallel spaced arms projecting outwardly from the flange are monolithic with the flange, and the magnet and the integrated circuit of the electromagnetic sensor head comprise a magnetic-field sensor.

In another embodiment, the electromagnetic sensor head is a substantially box-shaped electromagnetic sensor head and the sensor interface comprises flexible tabs projecting outwardly from opposing faces of the substantially box-shaped electromagnetic sensor head and the flange interface comprises a pair of parallel spaced arms projecting outwardly from the flange, said parallel spaced arms having opposing facing apertures, wherein insertion of the substantially box-shaped electromagnetic sensor head between the parallel spaced arms of the flange, with the flexible tabs oriented toward the respective parallel spaced arms, locks the flexible tabs in the apertures to secure the substantially box-shaped electromagnetic sensor head to the flange.

In another embodiment, the sensor interface for the electromagnetic sensor comprises a pair of opposing and outwardly facing projections from a substantially box-shaped electromagnetic sensor head, and the flange interface comprises a pair of semi-rigid, parallel spaced arms projecting outwardly from the flange, the semi-rigid, parallel spaced arms having opposing facing apertures, and wherein insertion of the substantially box-shaped electromagnetic sensor head between the semi-rigid, parallel spaced arms with the projections of the substantially box-shaped electromagnetic sensor head oriented toward the respective parallel spaced arms, locks the respective projections into the respective opposing facing apertures to secure the substantially box-shaped electromagnetic sensor head to the parallel spaced arms of the flange interface.

In another embodiment of the wheel speed monitoring system, a plurality of projecting elements projecting outwardly from a face of the tone ring and disposed in a pattern, comprises hills and valleys forming ridges extending outwardly toward the outer edge of the tone ring, wherein the electromagnetic sensor head senses the valleys and hills during rotation of the tone ring.

In another embodiment of the wheel speed monitoring system, the flange comprises one of a plurality of flanges having different shapes for different mounting locations on a vehicle, each of the plurality of flanges having the same flange interface for securement with the sensor interface of the electromagnetic sensor.

In another embodiment of the wheel speed monitoring system, the sensor interface and the flange interface are configured to provide a snap fitting connection of the electromagnetic sensor to the flange.

Other aspects of the invention will become apparent by consideration of the detailed description and accompanying drawings.

BRIEF DESCRIPTION OF THE DRAWINGS

FIG. 7 is views of a wheel speed sensor formed from the sensor of FIG. 5 and the flange of FIG. 6.

FIG. 14 is two views of an embodiment of the wheel speed sensor.

FIG. 16 is two views of another embodiment of the wheel speed sensor.

FIG. 17 is two views of another embodiment of the wheel speed sensor.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
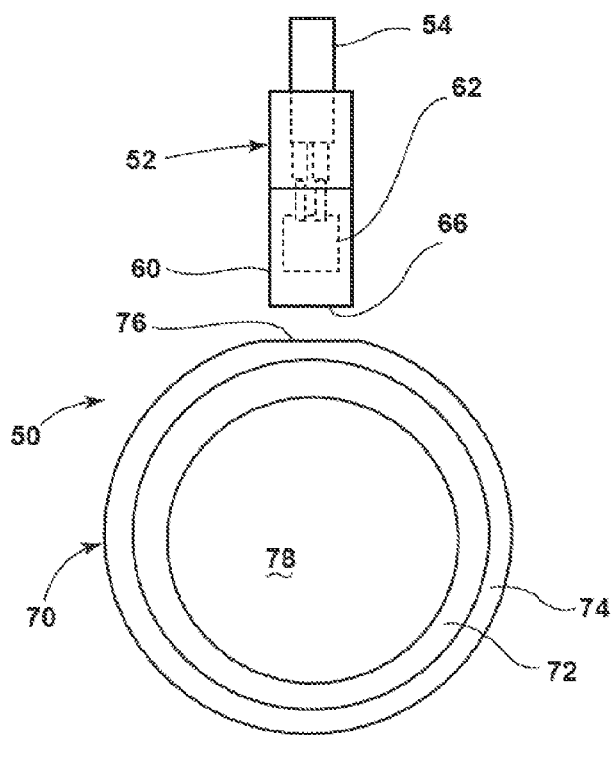
FIG. 1 is a front cross sectional view of an unassembled wheel speed sensor comprising an electromagnetic sensor and a flange.

FIG. 1 shows an unassembled wheel speed sensor 50 including an electromagnetic sensor 52 having a communication connector 54 at a proximal end and an electromagnetic sensor head 60 at a distal end. In some embodiments, the communication connector 54 is a cable harness. The electromagnetic sensor 52 includes an integrated circuit 62 and a magnet 64 (shown in FIG. 2) enclosed within the sensor head 60. A sensor interface 66, represented by the distal end of the sensor head 60 enables securement of the electromagnetic sensor 52 to another object. The communication connector 54 provides a connection from the integrated circuit 62 to a remote control unit (not shown). In some embodiments, the integrated circuit 62 and the magnet 64 of the electromagnetic sensor head 60 operates as a magnetic-field sensor. The magnet typically is a permanent magnet.

FIG. 1 also shows an annular flange 70 including an annular or cylindrical shaped metallic ring 72 and an outer element 74 extending outwardly about a portion of the outer circumferential surface of the cylindrical shaped ring. In some embodiments, the outer element 74 is overmolded onto the annular metallic ring 72. The annular flange 70 includes a flange interface 76. While shown as a depression for receiving the distal end of the electromagnetic sensor head 60 in FIG. 1, the flange interface 76 typically is a physical structure as discussed herein below. The flange 70 includes an open bore aperture 78 for receiving a wheel shaft, wherein the flange acts as a spacer along a wheel shaft.

Figure 2:
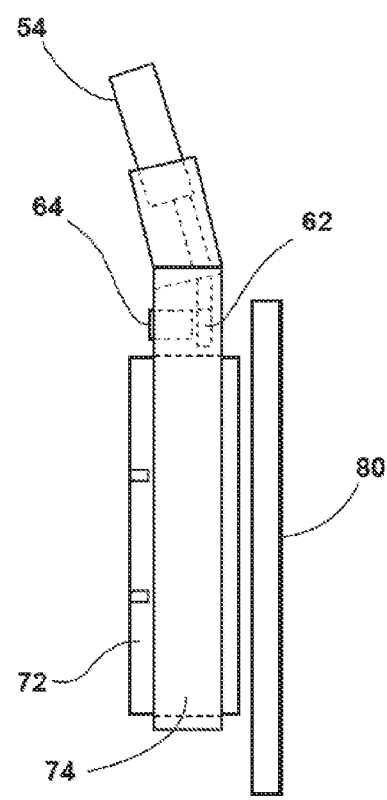
FIG. 2 is a side view of a wheel speed sensor and a tone ring.

FIG. 2 shows the wheel speed sensor 50 provided adjacent a tone ring 80. The tone ring 80 is a magnetically attractive material, and typically a ferrite that comprises any of several magnetic substances that consist essentially of ferric oxide combined with the oxides of one or more other metals (such as manganese, nickel, or zinc). A ferrite has high magnetic permeability and high electrical resistivity. However, a ferrite does not output a magnetic field, and thus does not act as a magnet. A permanent magnet is not contemplated for the tone ring.

Figure 3:
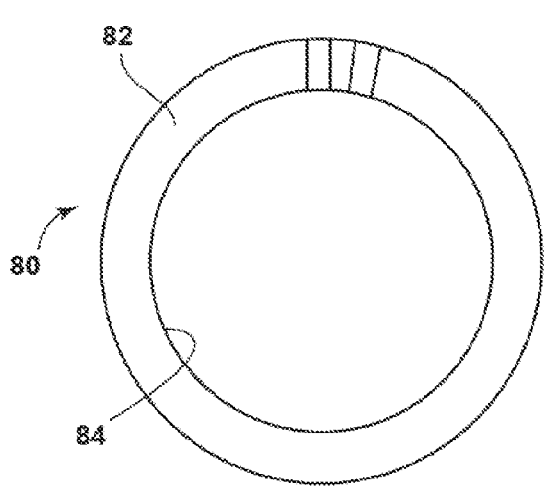
FIG. 3 is a front view of a tone ring.
Figure 4:
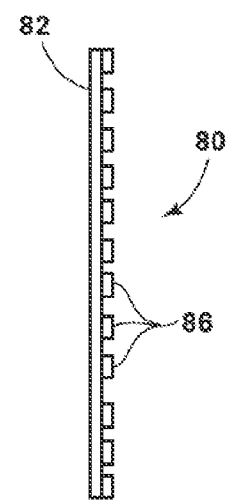
FIG. 4 is a side view of the tone ring of FIG. 3.

FIG. 3 shows a tone ring 80 having an annular shaped ring 82 and an open bore aperture 84 for receiving a wheel shaft therethrough. FIG. 4 shows the tone ring 80 having a plurality of projecting elements 86 projecting outwardly from one face of the tone ring 80. In another embodiment, the plurality of projecting elements are disposed in an alternating pattern that comprises hills and valleys forming ridges extending outwardly toward the outer edge of the tone ring. The projecting elements are teeth in some embodiments. In another embodiment, the projecting elements 86 are replaced by a plurality of apertures (not shown) extending through the tone ring 80 and providing an aperture pattern at essentially the same locations as the projecting elements 86, or at least adjacent an outer edge of the one face of the tone ring. In some embodiments, a plurality of cavities (not shown) provided in the tone ring 80 act as closed bore apertures.

Figure 5:
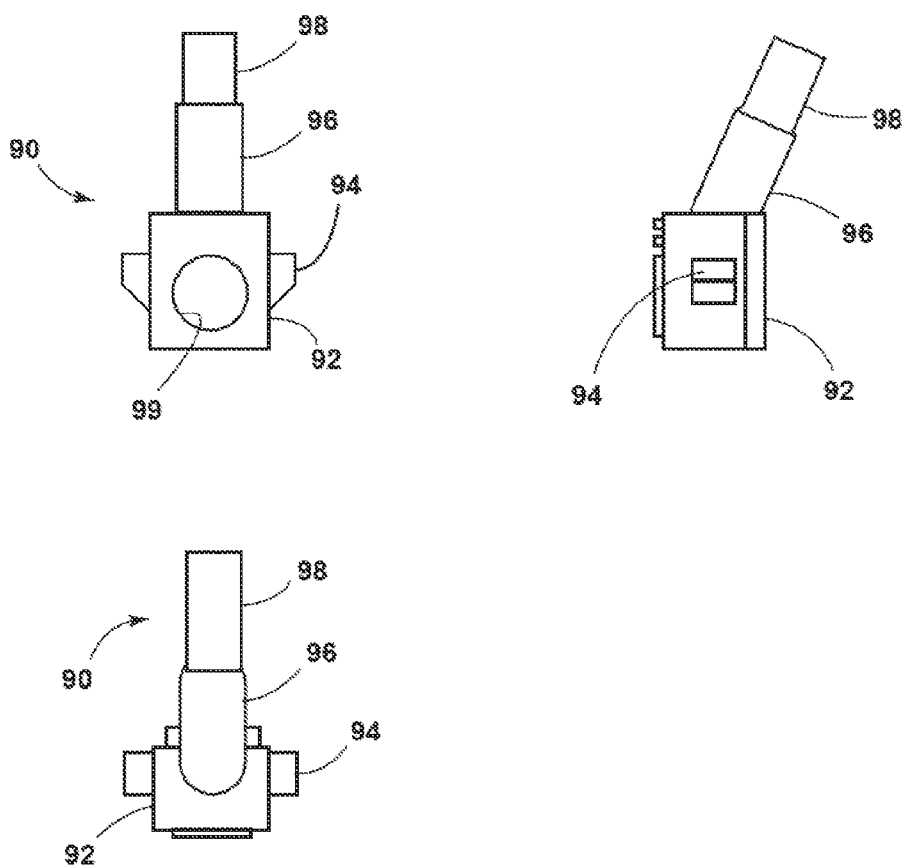
FIG. 5 is views of one embodiment of an electromagnetic sensor.

FIG. 5 shows one embodiment of an electromagnetic sensor 90 that includes an electromagnetic sensor head 92 having a substantially box-shape. The electromagnetic sensor 90 includes a sensor interface 94 in the form of tabs or ears, such as rigid or flexible tabs, projecting outwardly from opposing sides of the substantially box shaped electromagnetic sensor head 92. Other shaped projections 94 are contemplated. Further, the electromagnetic sensor includes a central part 96 disposed between the electromagnetic sensor head 92 at the distal end, and the communication connector 98. Finally, a slightly raised cylindrical surface 99 is shown on a side of the electromagnetic sensor head 92 to indicate the sensing side to be faced with the tone ring 80. The center of the raised cylindrical surface 99 indicates the position of the integrated circuit 62 embedded in the electromagnetic sensor head 92 to be aligned with the tone ring 80. Three views of the electromagnetic sensor 90 are provided to show the overall shape thereof.

Figure 6:
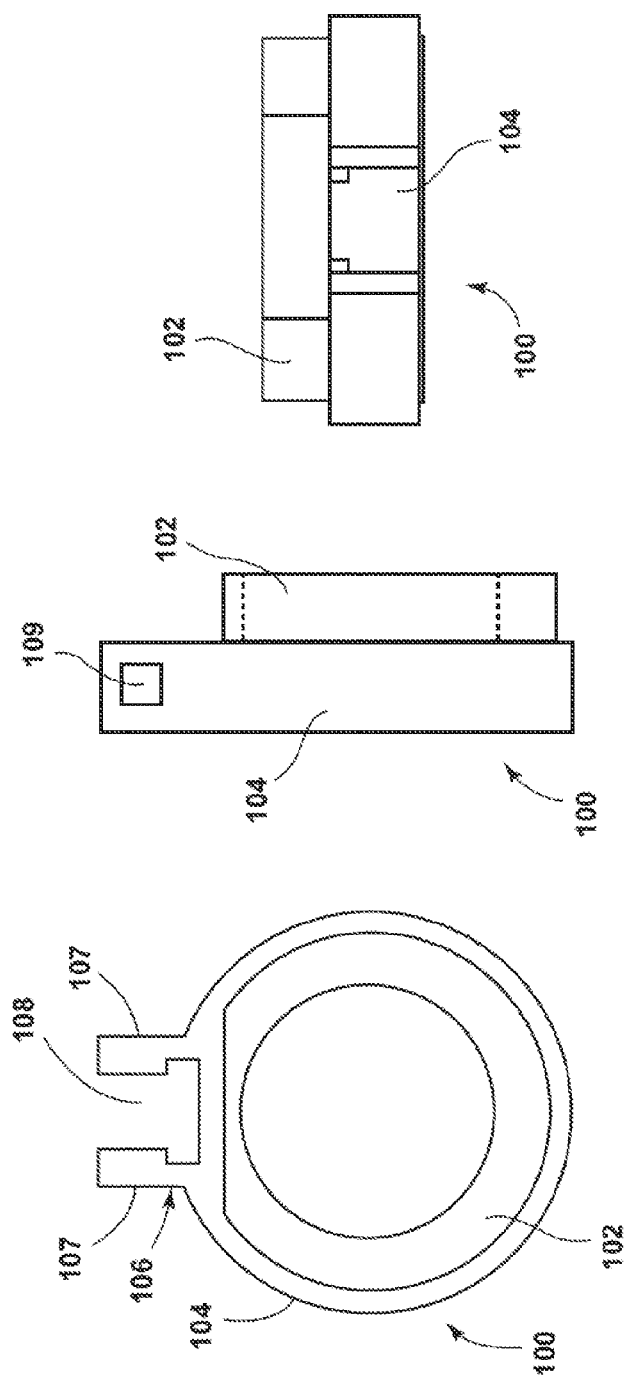
FIG. 6 is views of one embodiment of a flange.

FIG. 6 shows three views of a flange 100 or spacer for receiving the electromagnetic sensor 90 of FIG. 5 to form a wheel speed sensor. The flange includes a metal ring 102 and an outer element 104. The flange 100 further includes a flange interface 106 defined by a pair of parallel, outwardly projecting arms 107 facing each other, and a sensor head receiving slot or opening 108 therebetween. Finally, the arms 107 each include open bore apertures 109 in alignment with each other and are configured to receive the electromagnetic sensor head 92. The open bore apertures 109 are configured to receive the tabs 94 of the electromagnetic sensor head 92.

FIG. 7 shows three views of the electromagnetic sensor 90 and the flange 100 combined to form a wheel speed sensor 110. When combined, the electromagnetic sensor head 92 is disposed in the sensor head receiving slot 108 and the tabs 94 projecting from the electromagnetic sensor head 92 are locked into the respective apertures 109 of the flange 100. At least one of the arms 107 or tabs 94 have a certain amount of elasticity, or are flexible to enable forcing of the electromagnetic sensor head 92 into the slot 108. For instance, the arms are semi-rigid in some embodiments. Upon entrance of the tabs 94 into the apertures 109, a snap fit or locking occurs to for the wheel speed sensor 110. In some embodiments, the pair of parallel spaced arms 107 projecting outwardly from the flange 100 are monolithic with the flange. In other embodiments, the parallel, spaced arms 107 are attached or secured to the flange 100.

Figure 8:
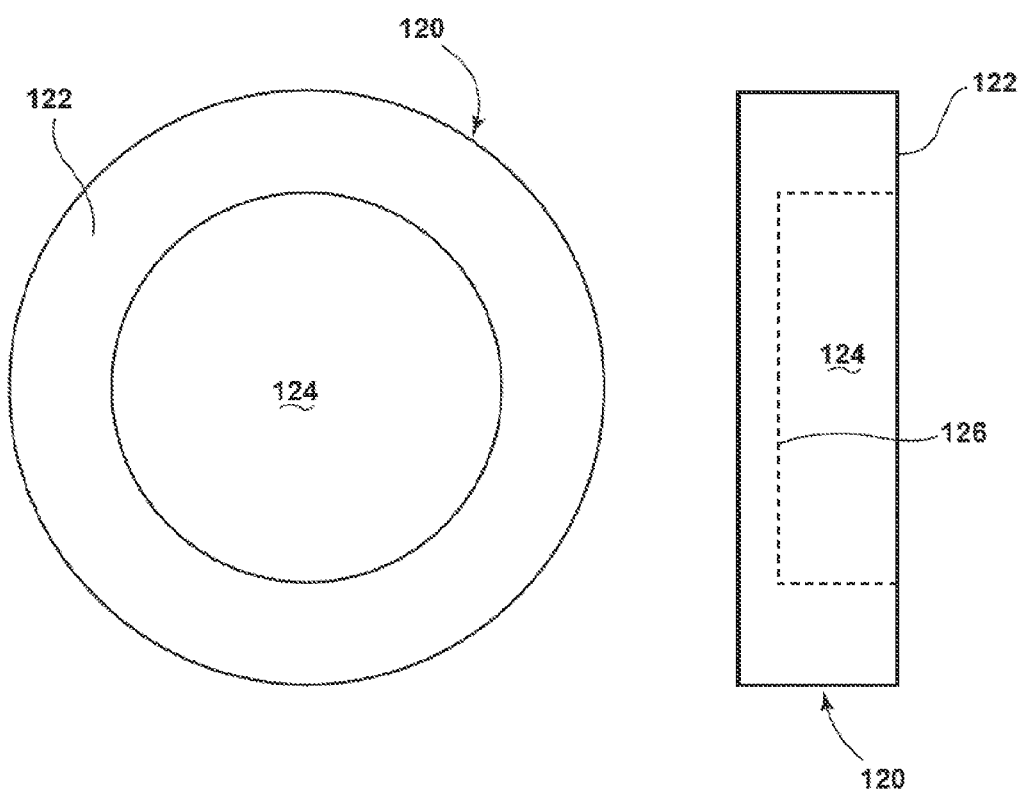
FIG. 8 is front and side views of a wheel hub.

FIG. 8 shows front and side views of a wheel hub 120. The wheel hub 120 includes an annular front face 122, a wheel bearing receiving aperture 124 and an inner face 126. The aperture 124 has an inner diameter and the inner face 126 is flat. While not shown, a path through the wheel hub 120 for a wheel shaft may be provided.

Figure 9:
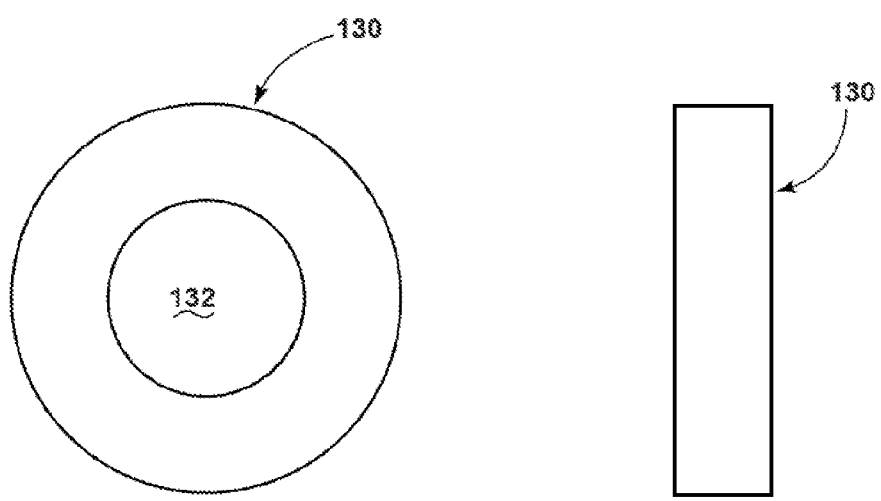
FIG. 9 is front and side views of a wheel bearing.

FIG. 9 shows front and side views of a wheel bearing 130 having a central open bore aperture 132 extending through the bearing. The wheel bearing 130 is dimensioned to fit within the bearing receiving aperture 124 of the wheel hub 120.

Figure 10:
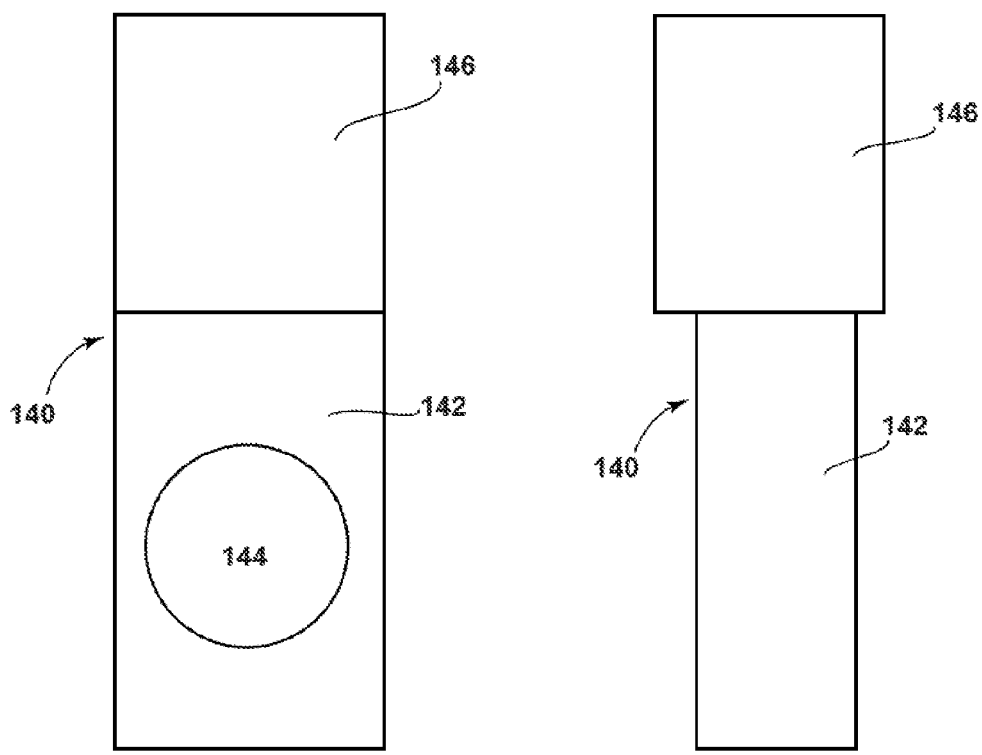
FIG. 10 is front and side views of a fork.

FIG. 10 shows part of a fork 140, typically for mounting to a motorcycle. The fork 140 includes an elongated lower fork bar 142 having an open bore fork aperture 144 and an upper fork bar 146 having a greater dimension in one direction than the lower fork bar.

Figure 11:
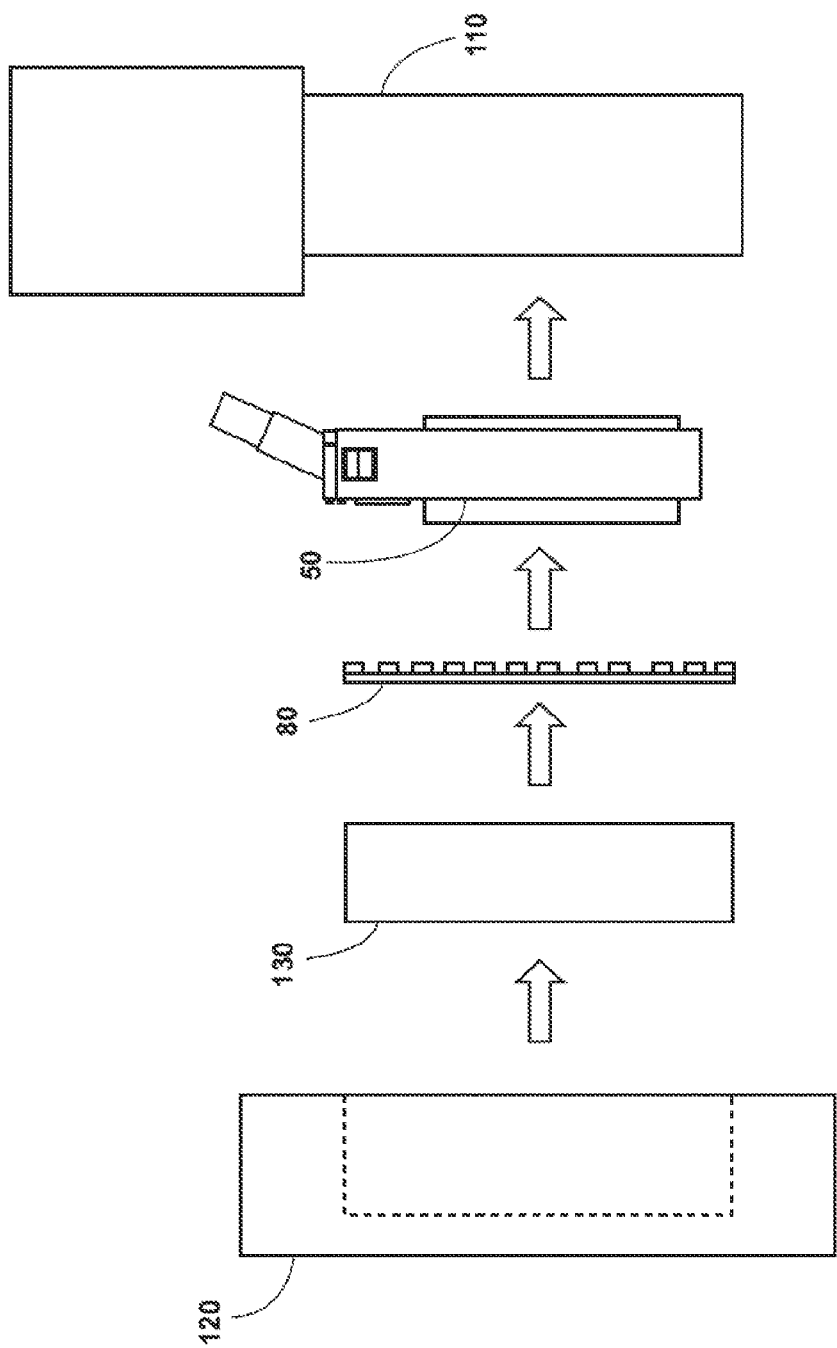
FIG. 11 is an unassembled view of an embodiment of the components for a portion of a wheel assembly with a speed sensor.
Figure 12:
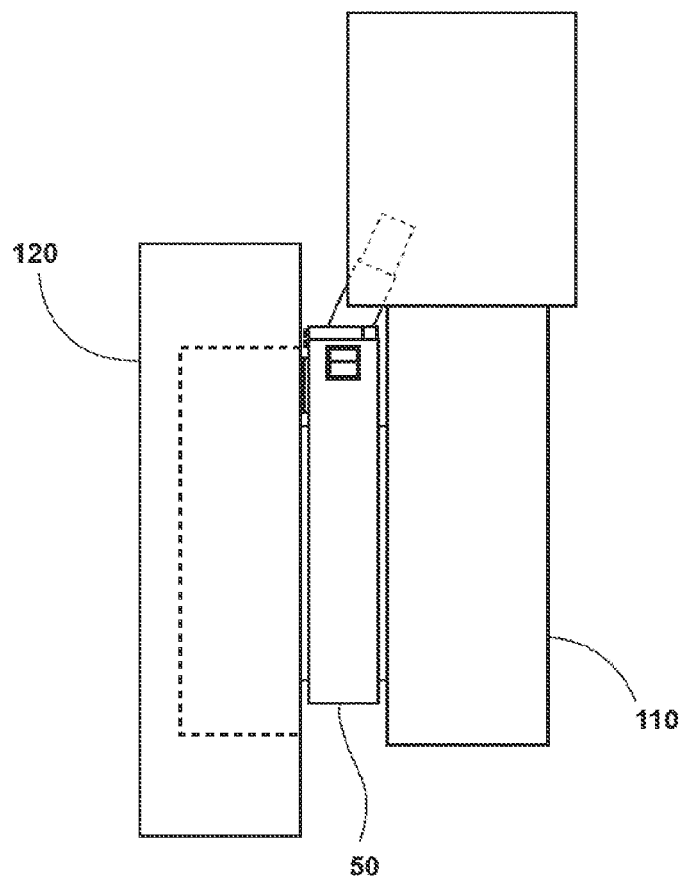
FIG. 12 is a side view of the components of the embodiment of FIG. 11 as assembled.

FIG. 11 shows the components for a portion of a cycle wheel assembly wherein the wheel speed sensor 50 is mounted as a part of the assembly. The components shown are the wheel hub 120 that receives the wheel bearing 130 and the tone ring 80. Further, the wheel speed sensor 50 is disposed between the tone ring 80 and the fork 140. The components are assembled in the order shown. An axle or wheel shaft extends through aligned apertures in the components and into through the wheel hub 120. The apertures are in axial alignment with each other and similar in diameter. FIG. 12 shows the components of FIG. 11 assembled, wherein the wheel hub 120, the wheel speed sensor 50 and the fork 140 visible. The wheel hub 120 is configured to receive the wheel bearing 130 and tone ring 80. Thus, the tone ring 80 is integrated adjacent to the wheel bearing 130 in the wheel hub 120.

Figure 13:
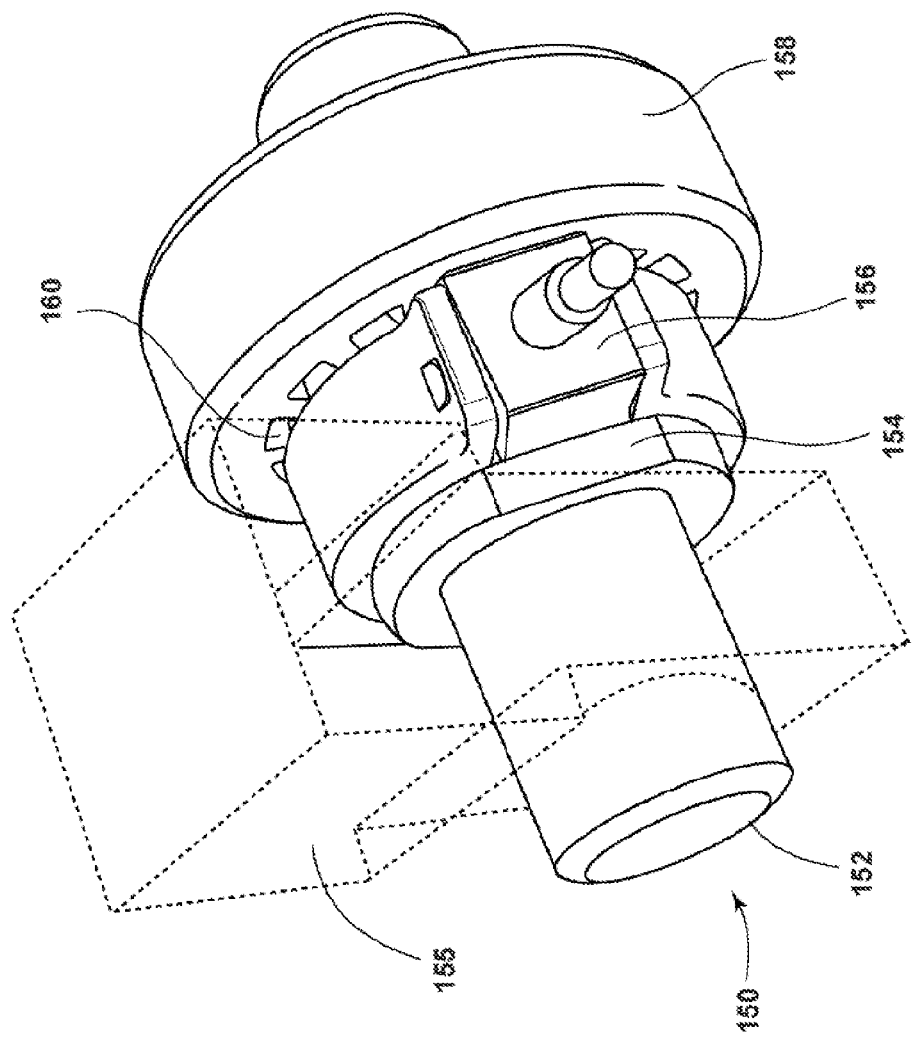
FIG. 13 is a perspective view of an embodiment a wheel assembly.

FIG. 13 shows a perspective view of an embodiment of a wheel assembly 150 similar to the arrangement of FIG. 12. In FIG. 13, a wheel shaft 152. The wheel shaft 152 extends through a fork 154. The structure 155 supporting the fork 154 is only for purposes of illustration. The wheel speed sensor 156 is disposed adjacent the fork 154 and the wheel hub 158. Portions of the tone ring 160 are visible facing the wheel speed sensor 156. As is illustrated in FIG. 13, the above components all receive the wheel shaft 152 therethrough. The components of FIG. 12 operate as a wheel speed monitoring system that operates as set forth below.

OPERATION

In operation, the tone ring shown in FIG. 13 rotates with a wheel (not shown). As shown in FIG. 2, the integrated circuit 62 is disposed between the magnet 64 and the tone ring 80. The magnet 64 projects a magnetic field through the integrated circuit 62 and the tone ring 80. The tone ring 80 is a magnetic attractive material. Thus, the tone ring 80 affects the magnetic field projected by the magnet 64. Rotation of the tone ring 80, and specifically movement of the spaced projections 86 of the tone ring 80 past the integrated circuit 62 cause changes in the magnetic field of the magnet 64 that are detected by the integrated circuit.

In one embodiment, when the tone ring 80 is in rotary motion, the magnetic flux density projected onto the integrated circuit 62 varies in a sinusoidal manner, due to the change in displacement between the magnet 64 and the outer edge of the tone ring 80. In one embodiment, the integrated circuit 62 contains a magnetic-field sensor such as Hall sensor or Magneto Resistive sensor that senses the variation of the magnetic flux density projected by the magnet 64. The integrated circuit 62 sends electrical signal such as current in different amplitudes corresponding to the variation of the magnetic flux density sensed by its magnetic-field sensor to a control unit via the communication connector 54. The frequency of change in the current signal between a low value and a greater value determines the wheel speed.

In conclusion, rotation of the tone ring 80 relative to the wheel speed sensor 50 alters magnetic flux density projected by the magnet 64 sensed by the integrated circuit 62, and the integrated circuit 62 sends an electrical signal, typically current in different amplitudes as an output that is proportional to rotational speed of the tone ring 80 relative to a control unit via the communication connector 54.

The above embodiments are all predicated on the flange 70 having an open bore aperture 78 for receiving a wheel shaft. Thus, the above embodiments are all directed to a wheel speed sensor that is disposed on the wheel shaft and acts as a spacer for components thereon. In other embodiments set forth below, the flange of the wheel speed sensor is provided with various shapes for mounting on a vehicle so that the sensor head is disposed adjacent to an outer part of the tone ring for sensing the passage thereby.

In some embodiments, the outer edge of the flat tone ring has an extension projecting perpendicular to the plane of the flat tone ring and extending about the entire circumference of the outer edge. Thus, the extension forms a cylindrical shape. Alternating projections from on outer face or apertures are provided in the extension about the entirety of the extension. Thus, rotation of the tone ring is sensed by a wheel speed sensor that is disposed outwardly of the tone ring. Accordingly, various mounting locations are available and various flanges are needed to locate the wheel speed sensor so that the sensor head is aligned properly with the tone ring.

The embodiments disclosed below permit mounting of an electromagnetic sensor to different flanges to enable use with various vehicles. By utilizing one electromagnetic sensor with a large number of flanges, the cost and time to develop, test and tool for a large number of wheel speed sensors for various vehicles is minimized, as only a large number of receiving flanges are required, that are less expensive and complicated than wheel speed sensors designed for specific vehicles.

Figure 15:
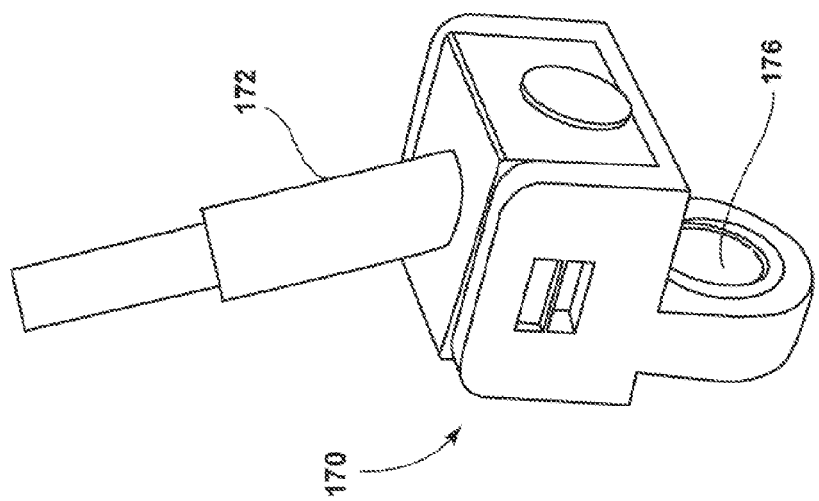
FIG. 15 is a perspective view of the embodiment of FIG. 14.

FIG. 14 shows two views of an embodiment of the wheel speed sensor 170 having the same or similar snap fit arrangement for mounting the electromagnetic sensor 172 to the flange 174 having a bushing 176. The arrangement enables a quick and easy snap fitting connection between the electromagnetic sensor 172 and the flange 174. In use, the bushing 176 is mounted to a fixed part of a vehicle so that the sensor head is aligned near a tone ring for measuring wheel speed. FIG. 15 is a perspective view of the embodiment shown in FIG. 14. A fastener (not shown) utilizes the bushing 176 to mount the wheel speed sensor 170.

FIG. 16 is another embodiment of the wheel speed sensor 180. The embodiment of FIG. 16 is similar to the embodiment of FIGS. 14 and 15, except the bushing 186 of the flange 184 is oriented perpendicular and sidewardly from the bushing arrangement shown in FIGS. 14 and 15. Thus, the wheel speed sensor 180 of FIG. 16 is mounted in a different vehicle or mounting location to provide the sensor head adjacent the tone ring.

Figure 18:
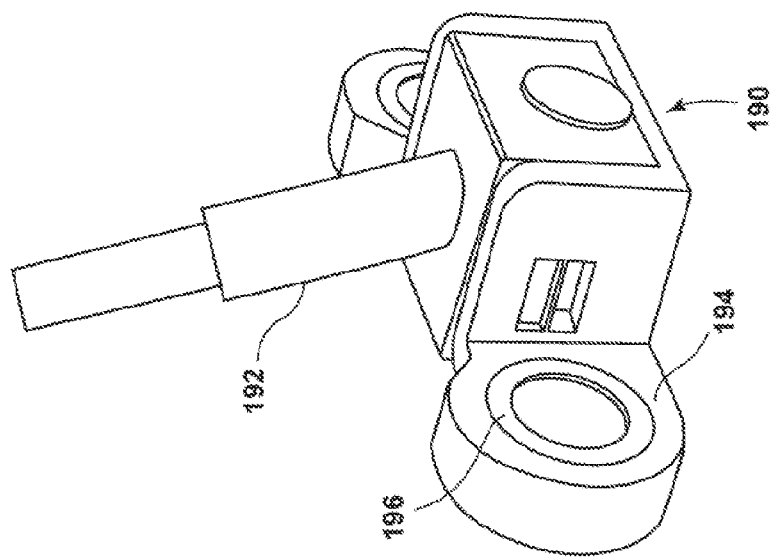
FIG. 18 is a perspective view of the embodiment of FIG. 17.

FIG. 17 is two views of another embodiment of the wheel speed sensor 190. The electromagnetic sensor 192 has the same snap mounting arrangement with the flange 194 as the embodiments discussed above. The flange 194 includes a pair of bushings 196 for mounting the wheel speed sensor 190. FIG. 18 is a perspective view the wheel speed sensor 190.

In other embodiments (not shown) flanges have bushings that are at 45, 75, 135 or other degree angles with respect to a rear or side of the sensor head of the wheel speed sensor.

Figure 20:
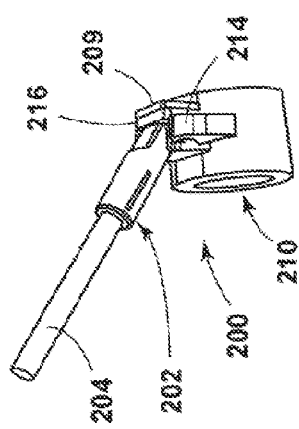
FIG. 20 is the assembled wheel speed sensor of FIG. 19.
Figure 19:
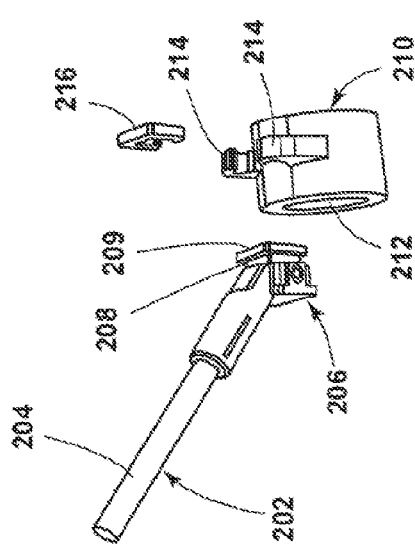
FIG. 19 is a view of an embodiment of unassembled wheel speed sensor including an electromagnetic sensor, a flange and a clip.

FIGS. 19 and 20 show another embodiment of a wheel speed sensor 200. More specifically, FIG. 19 shows an unassembled wheel speed sensor that includes an electromagnetic sensor 202 having a communication connector 204 at a proximal end an electromagnetic sensor head 206 at a distal end. The electromagnetic sensor head 206 is substantially box shaped. The electromagnetic sensor 202 has a sensor interface defined by a slot 208 extending about at least three sides of the substantially box-shaped electromagnetic sensor head 206. The slot 208 is defined by a narrow lip 209 at the tone ring facing end of the electromagnetic sensor head 206. The substantially box-shaped electromagnetic sensor head 206 is defined by an essentially flat face at the tone ring facing end.

FIG. 19 also shows a flange 210 that acts as a spacer when placed on a wheel shaft. The flange has an annular shape and an open bore aperture 212 for receiving a wheel shaft. The flange also has a flange interface comprising a pair of parallel outwardly projecting arms 214 having inwardly oriented projections at the distal ends thereof to receive the electromagnetic sensor head 206. A retainer element 216 is provided for securing the electromagnetic sensor 202 to the flange 210.

FIG. 20 shows the assembled wheel speed sensor 200 formed from the components shown in FIG. 19. More specifically, the electromagnetic sensor head 206 of the electromagnetic sensor 202 is located between the arms 214 that have inwardly oriented projections at the distal ends. A lip at the rear of the electromagnetic sensor head 206 contacts the arms 214 while the slot 208 is adjacent the opposing side of the arms 214. Then the retainer element 216 is seated in the slot 208 to lock the electromagnetic sensor 202 and the flange 210 together to form the wheel speed sensor 200 that is prepared for use with a wheel shaft.

Figure 21:
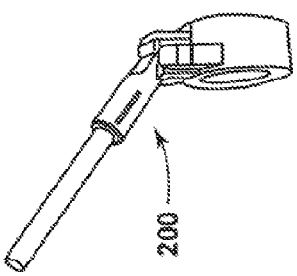
FIG. 21 is the wheel speed sensor of FIG. 20 with a different flange.

The wheel speed sensor 220 shown in FIG. 21 is essentially identical to the wheel speed sensor 200 shown in FIG. 20, except the flange has a reduced length and the pair of parallel outwardly projecting arms are not centered on an outer wall of the cylindrical shaped flange.

Figure 22:
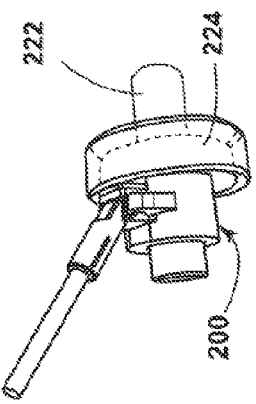
FIG. 22 is a wheel assembly.
Figure 23:
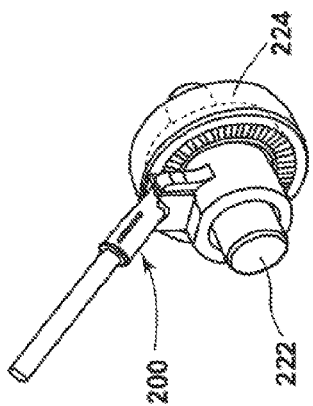
FIG. 23 is a perspective view of the wheel assembly of FIG. 22.

FIGS. 22 and 23 show the wheel speed sensor 200 of FIG. 20 disposed on a wheel shaft 222 adjacent a wheel hub 224. The perspective view of FIG. 23 shows a tone ring 226 disposed in or adjacent the wheel hub 224 that rotates with a wheel hub. The wheel speed sensor 200 measures wheel speed in a similar manner to the embodiment discussed above.

Figure 24:
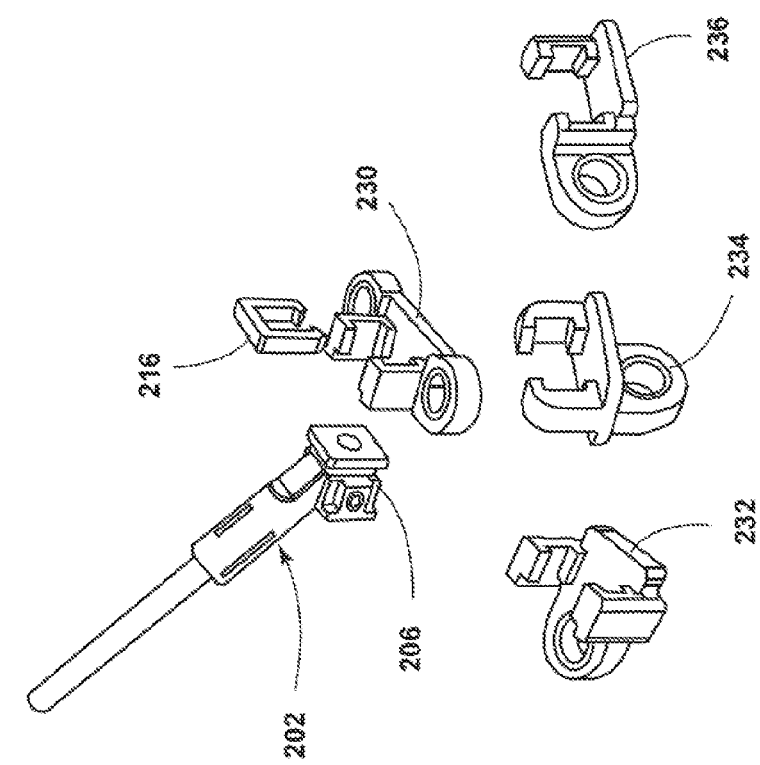
FIG. 24 is the electromagnetic sensor of FIG. 19 provided with a plurality of different flanges.

FIG. 24 shows the electromagnetic sensor 202 and a separate retainer element 216 of FIG. 19, along with a plurality of different flanges 230, 232, 234, 236. The different flanges have bushings for mounted to a fixed part of a vehicle. The bushings have different orientations with respect the electromagnetic sensor head 206 of the electromagnetic sensor 202. Thus, the flange for a specific vehicle is selected, secured to the electromagnetic sensor 202 to form a wheel speed sensor with the retainer element 216, and mounted to a vehicle adjacent a tone ring via the bushings and a fastener (not shown).

Figure 25:
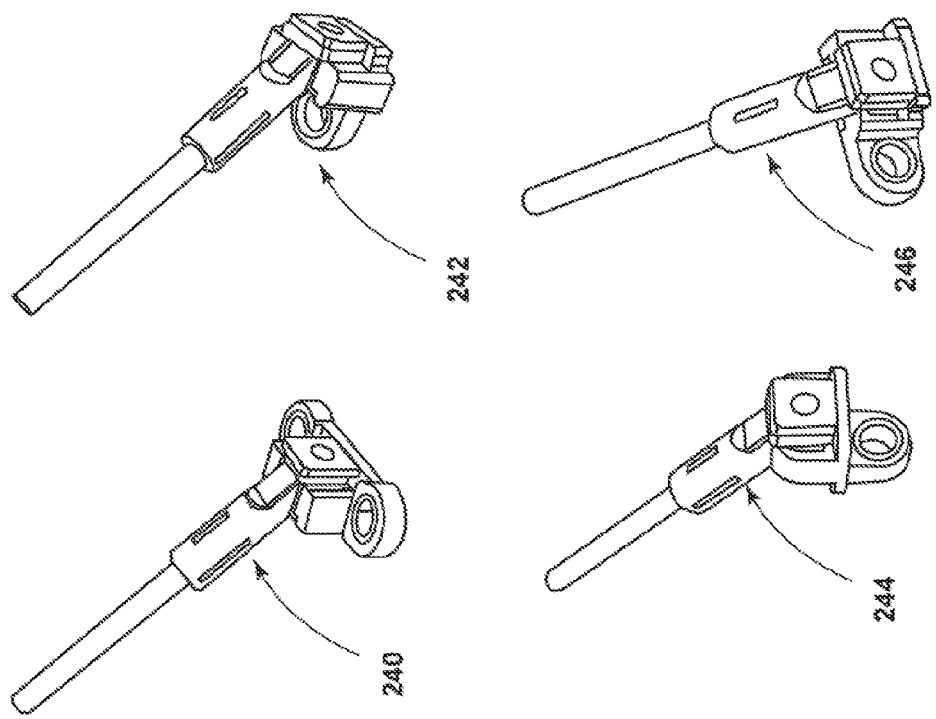
FIG. 25 is wheel speed sensors assembled from the electromagnetic sensor and the flanges shown in FIG. 24.

FIG. 25 shows wheel speed sensors 240, 242, 244, 246 assembled from the electromagnetic sensor 202 and the respective flanges 230, 232, 234, 236 shown in FIG. 24.

Figure 26:
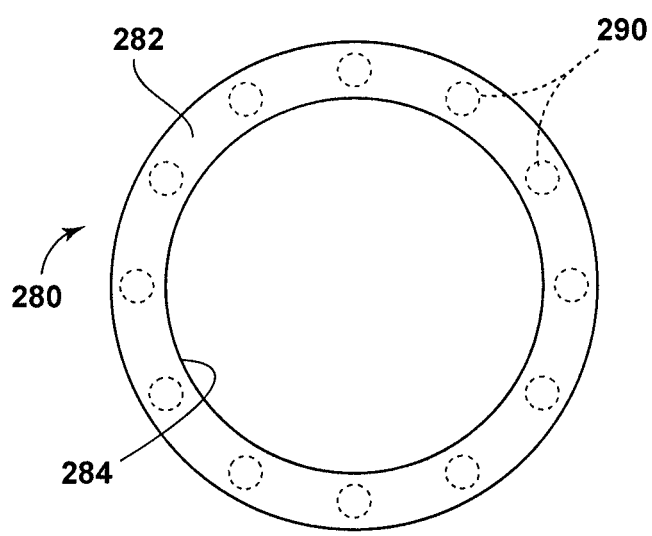
FIG. 26 is a front view of an embodiment of a tone ring.

FIG. 26 shows a tone ring 280 having an annular shaped ring 282 and an open bore aperture 284 for receiving a wheel shaft therethrough. FIG. 26 shows the tone ring 280 having a plurality of apertures 290 disposed in an aperture pattern at least adjacent an outer edge of the one face of the tone ring.

Thus, the invention provides, among other things, an easy approach to providing an easy to assemble wheel speed sensor for mounting on any vehicle. The invention enables a vehicle manufacturer to use a common, validated electromagnetic sensor design, with different mounting flanges for different vehicles that have different mounting constraints, thus substantially reduces the time and costs for developing, testing and tooling for different wheel speed sensors, as the cost of developing, and tooling a new flange, which is a mechanical component that is less complicated than the electromagnetic sensor is minimal compared to a complete wheel speed sensor. Various features and advantages of the invention are set forth in the following claims.

What is claimed is:

1. A wheel speed sensor comprising:
an electromagnetic sensor comprising:
a substantially box-shaped electromagnetic sensor head disposed at a distal end of the electromagnetic sensor, the electromagnetic sensor head comprising a magnet and an integrated circuit, the substantially box-shaped electromagnetic sensor head configured to sense movement by a tone ring comprising magnetic attractive material;
a communication connector disposed at a proximal end of the electromagnetic sensor and in communication with the substantially box-shaped electromagnetic sensor head; and
a sensor interface disposed at the distal end of the electromagnetic sensor, and
a flange including a flange interface secured to the sensor interface of the electromagnetic sensor,
wherein the sensor interface includes a slot extending about at least three sides of the substantially box-shaped electromagnetic sensor head and a separate retainer element, and
wherein the flange interface includes a pair of parallel spaced arms projecting outwardly from the flange, the pair of parallel spaced arms including inwardly facing projections at outward distal ends thereof, wherein the electromagnetic sensor is secured to the flange interface by insertion the substantially box-shaped electromagnetic sensor head between the pair of spaced arms of the flange interface and securement of the retainer element within the slot of the substantially box-shaped electromagnetic sensor head.

2. The wheel speed sensor according to claim 1, wherein the flange has an annular shape and includes an open bore aperture, the flange comprising a spacer for receiving a wheel shaft of a vehicle through the open bore aperture.

3. The wheel speed sensor according to claim 1, wherein the sensor interface and the flange interface are configured to provide a snap fitting connection of the electromagnetic sensor to the flange.

4. The wheel speed sensor according to claim 1, wherein the pair of parallel spaced arms projecting outwardly from the flange are monolithic with the flange.

5. The wheel speed sensor according to claim 1, wherein the flange comprises at least one bushing for securing the wheel speed sensor to a fixed part of a vehicle.

6. The wheel speed sensor according to claim 1, wherein the magnetic attractive material forming the tone ring is a ferrite.

7. The wheel speed sensor according to claim 1, wherein the flange comprises one of a plurality of flanges having different shapes for mounting at different mounting locations on a vehicle, wherein the magnet is a permanent magnet that is oriented toward an outer periphery of the tone ring, and wherein the integrated circuit is disposed between the permanent magnet and the tone ring.

8. A wheel speed sensor comprising:
an electromagnetic sensor comprising:
a substantially box-shaped electromagnetic sensor head disposed at a distal end of the electromagnetic sensor, the electromagnetic sensor head comprising a magnet and an integrated circuit, the substantially box-shaped electromagnetic sensor head configured to sense movement by a tone ring comprising magnetic attractive material;
a communication connector disposed at a proximal end of the electromagnetic sensor and in communication with the substantially box-shaped electromagnetic sensor head; and
a sensor interface disposed at the distal end of the electromagnetic sensor, and
a flange including a flange interface secured to the sensor interface of the electromagnetic sensor
wherein the sensor interface includes flexible tabs projecting outwardly from opposing faces of the substantially box-shaped electromagnetic sensor head and the flange interface includes a pair of parallel spaced arms projecting outwardly from the flange, said parallel spaced arms having opposing facing apertures, and
wherein the insertion of the substantially box-shaped electromagnetic sensor head between the parallel spaced arms of the flange interface, with the flexible tabs oriented toward the respective parallel spaced arms, locks the flexible tabs in the apertures to secure the electromagnetic sensor to the flange.

9. The wheel speed sensor according to claim 8, wherein the flange comprises at least one bushing for securing the wheel speed sensor to a fixed part of a vehicle.

10. The wheel speed sensor according to claim 8, wherein the magnetic attractive material forming the tone ring is a ferrite.

11. The wheel speed sensor according to claim 8, wherein the flange comprises one of a plurality of flanges having different shapes for mounting at different mounting locations on a vehicle, wherein the magnet is a permanent magnet that is oriented toward an outer periphery of the tone ring, and wherein the integrated circuit is disposed between the permanent magnet and the tone ring.

12. The wheel speed sensor according to claim 8, wherein the flange has an annular shape and includes an open bore aperture, the flange including a spacer for receiving a wheel shaft of a vehicle through the open bore aperture.

13. The wheel speed sensor according to claim 8, wherein the sensor interface and the flange interface are configured to provide a snap fitting connection of the electromagnetic sensor to the flange.

14. The wheel speed sensor according to claim 8, wherein the pair of parallel spaced arms projecting outwardly from the flange are monolithic with the flange.

15. A wheel speed sensor comprising:
an electromagnetic sensor comprising:
   a substantially box-shaped electromagnetic sensor head disposed at a distal end of the electromagnetic sensor, the electromagnetic sensor head comprising a magnet and an integrated circuit, the substantially box-shaped electromagnetic sensor head configured to sense movement by a tone ring comprising magnetic attractive material;
   a communication connector disposed at a proximal end of the electromagnetic sensor and in communication with the substantially box-shaped electromagnetic sensor head, and
   a sensor interface disposed at the distal end of the electromagnetic sensor, and
a flange including a flange interface secured to the sensor interface of the electromagnetic sensor,
wherein the sensor interface comprises a pair of opposing and outwardly facing projections projecting from opposing sides of the substantially box-shaped electromagnetic sensor head,
wherein the flange interface comprises a pair of semi-rigid, parallel spaced arms projecting outwardly from the flange, said semi-rigid, parallel spaced arms having opposing facing apertures, and
wherein insertion of the substantially box-shaped electromagnetic sensor head between the semi-rigid, parallel spaced arms, with the projections of the substantially box-shaped electromagnetic sensor head oriented toward the respective semi-rigid, parallel spaced arms, locks the respective projections into the respective opposing facing apertures to secure the electromagnetic sensor to the semi-rigid, parallel spaced arms.

16. The wheel speed sensor according to claim 15, wherein the flange comprises at least one bushing for securing the wheel speed sensor to a fixed part of a vehicle.

17. The wheel speed sensor according to claim 15, wherein the magnetic attractive material forming the tone ring is a ferrite.

18. The wheel speed sensor according to claim 15, wherein the flange comprises one of a plurality of flanges having different shapes for mounting at different mounting locations on a vehicle, wherein the magnet is a permanent magnet that is oriented toward an outer periphery of the tone ring, and wherein the integrated circuit is disposed between the permanent magnet and the tone ring.

19. The wheel speed sensor according to claim 15, wherein the flange has an annular shape and includes an open bore aperture, the flange including a spacer for receiving a wheel shaft of a vehicle through the open bore aperture.

20. The wheel speed sensor according to claim 15, wherein the sensor interface and the flange interface are configured to provide a snap fitting connection of the electromagnetic sensor to the flange, and wherein the pair of semi-rigid, parallel spaced arms projecting outwardly from the flange are monolithic with the flange.

\* \* \* \* \*